March 26, 1963  J. W. LESLIE  3,082,425
NAIL CLIP ASSEMBLY
Filed May 23, 1961
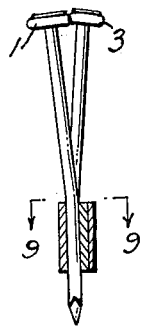
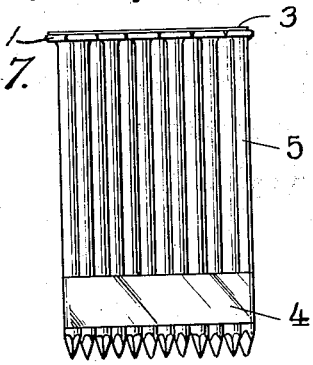
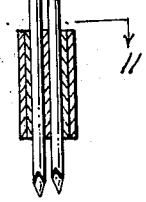
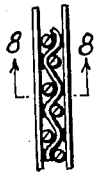
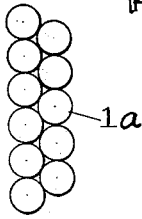
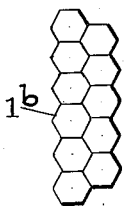
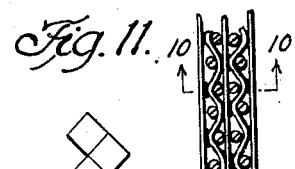
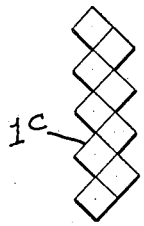
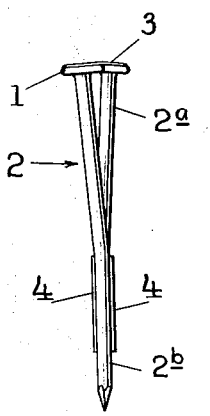
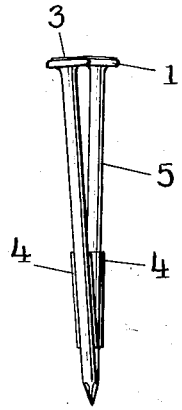
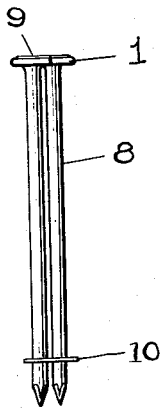
Inventor,
John W. Leslie,
By: Schneider, Dressler, Goldsmith & Clement, Attys.

United States Patent Office 3,082,425
Patented Mar. 26, 1963

1

3,082,425
NAIL CLIP ASSEMBLY
John W. Leslie, Evanston, Ill., assignor to Signode Steel Strapping Company, a corporation of Delaware
Filed May 23, 1961, Ser. No. 112,103
3 Claims. (Cl. 1—56)

This invention relates to nails and, particularly, to an adhered array of full headed nails for use with power operated nail driving machines.

With the increased availability of power operated nail driving machines, it has become necessary to provide various types of nails in an adhered strip or clip for use in automatic nail hammering devices.

The present invention deals with nails having full heads such as common nails which are used in large quantities in construction work. Previously, full headed nails in packaged form have been available in a clip made up of nails that are spaced apart on a strip of material, or in a fan arrangement in which the heads of the adjacent nails are overlapped and the shanks are disposed adjacent to each other. With either arrangement, the number of full headed nails that can be assembled in a given length of magazine is severely limited. In the first case, the number of nails is limited by the space necessary to incorporate a group of nails on a strip of material, and in the second case by the shape of the fan resulting from assembling the nails in an overlapping relationship.

By practicing the invention disclosed in this application, it is possible to arrange full headed nails in a clip thereof in such a manner that a maximum number of nails may be assembled within a given length for use in the magazine of a nailing machine. A number of such arrangements are described in the following specification and illustrated in the attached drawing. One of the arrangements consists of a double row of nails in which the heads are offset and the nail points converge to form a single row. The adjacent shanks of the nails in this arrangement are in abutting relationship along a portion of their length. Such a clip or stick of nails could be used in a straight magazine, rather than requiring a special magazine.

Another disclosed arrangement consists of a double row of nails that are secured together by a frangible adhesive extending across the heads of the nails and along the shanks, which shanks are disposed in parallel relationship. These are but two illustrative arrangements for packaging full headed nails in accordance with the instant invention. In all instances, the heads are arranged in substantially the same plane and in a plurality of rows, generally, in an alternating or "bee-hive" like manner. The invention has made possible the packaging of the maximum number of full-headed nails in the minimum amount of space.

While an adhesive tape may be employed to secure the nails into a clip assembly, the description thereof is intended to be representative and not to limit the invention to the use of such material. It is obvious that any desired adhesive may be used to secure the nails together.

The invention is described herein with nails having round, hexagonal, and diamond shaped heads; but these are merely examples of enlarged nail heads that can be employed, since it is obvious that other head configurations would be encompassed by the invention. This is also true with respect to the shank portions, since the nail could have a square or round shank, or any other desired shape.

Numerous other features and advantages of the present invention will appear from the following description taken in conjunction with the accompanying drawings which show various embodiments of the invention and which form a part of the specification, and in which:

FIGURE 1 is a view showing rows of "bent" nails which are adhered together at their head portions and along their shanks;

FIGURE 2 shows two rows of nails in which the shanks converge to form a straight line and are cohered by an adhesive interconnecting the heads and shanks;

FIGURE 3 illustrates two rows of nails in which the shanks are disposed parallel to each other;

FIGURES 4, 5, and 6 illustrate various head configurations to which the invention is adaptable;

FIGURE 7 is a side view of the adhered array of nails shown in FIGURE 1 or 2;

FIGURE 8 is a view showing rows of nails having arcuate shanks, which view is taken along lines 8—8 of FIGURE 9;

FIGURE 9 is a sectional view taken along lines 9—9 of FIGURE 8;

FIGURE 10 illustrates two rows of nails which are maintained in parallel relationship and are held together by corrugated paper; and FIGURE 11 is a sectional view taken along lines 11—11 of FIGURE 10.

There is illustrated in FIGURE 1 an array or clip of nails in which the head portions 1 are arranged in two rows and in which the shanks 2 are bent so that the points converge to a straight line. The two rows of nail heads are substantially coplanar and are nested together in a bee-hive-like arrangement, as shown in FIGURES 4, 5, or 6, depending on whether nails having round, hexagonal, or diamond shaped heads 1a, 1b, 1c, respectively, are used. The slight deviation from a perfectly flat plane is due to the angular positioning of the shanks. The upper portions 2a of adjacent bent nails 2 diverge and form a V when viewed in end elevation. The lower portions 2b are parallel and coplanar, and the tips of the nails form a straight line. This permits two rows of nails having abutting and substantially coplanar head portions to be located within a minimum area.

The heads of the nails are secured by a friable adhesive 3 extending across the tops of the heads 1 thereof and the shanks 2 are interconnected by an adhesive material 4 extending along both sides of the shanks. The power operated nail hammers with which these nails are used drive the nails in with an impact force of a magnitude such that the slight bend in the nails does not materially affect joining characteristics of the nails.

The two rows of nails shown in FIGURE 2 are made up of straight nails in which the shanks 5 of the adjacent nails converge in V fashion to form a straight line along the points thereof. The heads 1 are disposed in abutting, nested relationship and positioned as shown in FIGURES 4, 5, or 6, depending on the nail head configuration employed. The heads 1 are substantially coplanar since they deviate only slightly from a flat plane due to the slight angle at which the adjacent nails are disposed. The nails of the clip are adhered by a friable adhesive 3 extending across the tops of the heads 1 and strips 4 of a similar material extending across both sides of the shanks.

While the shank portion 2a of the nails shown in FIGURE 1 and shank 5 of the nails shown in FIGURE 2 are shown as being straight, they may be bent in the form of an arc, as shown in FIGURES 8 and 9, if so desired.

The embodiment of the present invention illustrated in FIGURE 3 is made up of two rows of nails in which the enlarged heads 1 are in abutting, nested, alternating relationship and the shanks 8 are parallel to each other. The heads 1 are coplanar and are joined by an adhesive 9 extending across the tops thereof. The shanks 18 are secured together by a friable adhesive or a frangible strip of sheet material 10 having a plurality of holes through which the shanks 8 extend. The strip 10 can be secured to the shanks 8 by glue or lacquer or merely frictionally engage the same, and serves to maintain the nail shanks in parallel relationship. An alternative method would be to use a soft strip made from plain or corrugated paper that would lie between the two rows of nails and be coated with an adhesive (see FIGURES 10 and 11).

While two rows of nails are illustrated in each arrangement shown in the drawings, the nail clips could be made of a larger number of rows, if desired, within the scope of this invention. Thus, it can be seen that the invention relates to nail clip assemblies made up of several rows of full headed nails arranged with the heads thereof in a nested, juxtaposed relation. The nail heads may be in abutting relation, or there may be a slight spacing therebetween. The nails may have round, hexagonal, or diamond shaped heads, as shown in FIGURES 1, 2, and 3, or other shaped heads, if desired. The nails are adhered together in strip form and are readily available for use with either manual or automatic nailing devices. The nails when used with automatic devices will be disposed in a magazine, and during the nailing operation, the nails will be readily severed from the adhered strip. In such devices, the full head of the nail is exposed to the nail hammer with the result that the nail will be driven cleanly and evenly into place with maximum holding power as provided by the full head of the nail. During the nailing operation, the several rows of nails can be advanced in increments into the area where they will be engaged by the nail driver.

From the foregoing, it will be observed that numerous variations and modifications may be effected without departing from the true spirit and scope of the novel concepts of the invention.

I claim:
1. A nail clip comprising an array of two rows of nested nails, each nail having an enlarged head portion and a shank, the head portions of the nails disposed adjacent each other and the shank portions of the adjacent nails abutting at their terminal portions and converging to form a straight line, and means adhering the two rows of nails together.

2. A nail clip comprising an array of two rows of nested nails, each nail having a head portion and a shank portion, the head portion of each nail having radial dimensions greater than the radial dimensions of the shank portion and abutting the head of the adjacent nail, the upper half of each shank portion being bent to form a V with the upper half of the shank portion of an adjacent nail and the lower half of the shank portions of the nails in the rows of nails being coplanar and in abutting relationship, and means for adhering two rows of nails together.

3. A nail clip comprising an array of nails, each having a full head and a shank portion with the heads of the nails being located in the same plane, the head of each nail in the array abutting the adjacent nail head in the array, the shank portions being disposed in parallel relationship, and a friable adhesive extending across the heads of the nails and a sheet member secured to the shanks of the nails for adhering the array of nails together.

References Cited in the file of this patent
UNITED STATES PATENTS

| | | |
|---|---|---|
| 159,777 | Sturtevant | Feb. 16, 1875 |
| 288,958 | Titzell | Nov. 20, 1883 |
| 2,132,296 | Hill | Oct. 4, 1938 |
| 2,784,405 | Working | Mar. 12, 1957 |
| 2,909,781 | Ollig | Oct. 27, 1959 |